(12) United States Patent
Yokouchi et al.

(10) Patent No.: US 6,628,328 B1
(45) Date of Patent: Sep. 30, 2003

(54) IMAGE PICKUP APPARATUS HAVING A CPU DRIVING FUNCTION OPERABLE IN TWO MODES

(75) Inventors: Masaki Yokouchi, Kokubunji (JP); Takayuki Kijima, Akiruno (JP); Junzo Sakurai, Koganei (JP); Yoshitaka Ogawa, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/161,585

(22) Filed: Sep. 28, 1998

(30) Foreign Application Priority Data

Sep. 30, 1997  (JP) .............................................. 9-281074

(51) Int. Cl.$^7$ .......................... H04N 3/14; H04N 5/235; H04N 5/238
(52) U.S. Cl. ..................... 348/221.1; 348/296; 348/312; 348/317; 348/364
(58) Field of Search ................................. 348/207, 220, 348/221, 222, 240, 294–304, 307–312, 315–319, 362, 363, 364, 222.1, 229.1, 230.1, 220.1, 221.1; 250/208.1; H04N 3/14, 5/238, 5/235

(56) References Cited

U.S. PATENT DOCUMENTS

| | | | | | |
|---|---|---|---|---|---|
| 4,910,599 A | * | 3/1990 | Hashimoto | ..................... | 348/2 |
| 4,985,775 A | * | 1/1991 | Murayama | ................... | 348/314 |
| 5,051,833 A | * | 9/1991 | Tsuji | ........................... | 348/364 |
| 5,196,939 A | * | 3/1993 | Elabd | .......................... | 348/314 |
| 5,563,658 A | * | 10/1996 | Parulski | ..................... | 348/350 |
| 5,668,597 A | * | 9/1997 | Parulski | ..................... | 348/350 |
| 6,124,888 A | * | 9/2000 | Terada | ........................ | 348/302 |
| 6,130,420 A | * | 10/2000 | Tanaka | .................... | 250/208.1 |
| 6,204,879 B1 | * | 3/2001 | Koseki | ........................ | 348/230 |
| 6,342,921 B1 | * | 1/2002 | Yamaguchi | ................. | 348/322 |

* cited by examiner

*Primary Examiner*—Ngoc-Yen Vu
(74) *Attorney, Agent, or Firm*—Armstrong, Westerman & Hattori, LLP.

(57) ABSTRACT

In an image pickup apparatus comprising a CCD image pickup device made up of a plurality of pixels constituted by photodiodes which are two-dimensionally arrayed, a vertical register and a horizontal register, and a CPU for driving and controlling the CCD image pickup device, the CPU has a driving function in an all-pixel read mode for reading pixel signals from all the pixels of the CCD image pickup device, a driving function in a thinning (skipping) read mode for reading pixel signals from all the pixels in a thinned-out fashion, and a device shutter function for extracting signal electric charges from each pixel to control an exposure time. In the thinning read mode, the operation of extracting the signal electric charges from each pixel is carried out one or more times for each read period of one frame.

5 Claims, 14 Drawing Sheets

IMAGE PICKUP APPARATUS HAVING A CPU DRIVING FUNCTION OPERABLE IN TWO MODES

BACKGROUND OF THE INVENTION

1. Field of the Invention

The present invention relates to an image pickup apparatus including drive/control means operated in an all-pixel read mode for reading pixel signals from all pixels and a thinning read mode for reading pixel signals from all pixels in a thinned-out fashion, and more particularly to an image pickup apparatus capable of being smoothly switched over in operation between the thinning read mode and the all-pixel read mode.

2. Description of the Related Art

Recently, with image pickup apparatus using CCD image pickup devices, which are utilized in electronic cameras or the like, constructed of a large number of pixels, the apparatus has been designed to read pixels in a skipping fashion, i.e., in a thinned-out fashion, without reading all the pixels except recording of a still picture, for thereby achieving high-speed processing that is required, e.g., when an image is to be displayed in a liquid crystal display unit, and when the AE or AF operation is to be carried out. By operating the image pickup apparatus in such a thinning read mode, pixel signals can be read at a higher speed than an all-pixel read mode because all the pixels are not read in the thinning read mode. In the liquid crystal display unit, for example, the number of frames displayed per second can be increased, and therefore a smooth motion picture can be displayed rather than an intermittent frame picture.

When a CCD image pickup device is driven in the skipping read mode (thinning read mode), some of pixel lines are read, but the remaining pixel lines are not read. Then, if exposure is repeated many times for the pixel lines which are not read, signal electric charges may overflow from photodiodes constituting pixels of those lines and may mix into transfer lines. Also, in image pickup apparatus operated in the skipping read mode and the all-pixel read mode, when the operating mode is shifted from the skipping read mode to the all-pixel read mode, there arises a similar problem. Specifically, if signal electric charges overflow in some lines which are subjected to multiple exposures in the skipping read mode, the signal electric charges generated in the skipping read mode and still remained in the pixels of those lines may mix in signal electric charges generated in the all-pixel read mode.

SUMMARY OF THE INVENTION

The present invention has been made with a view of solving the above-mentioned problems in the conventional image pickup apparatus including drive/control means operated in a thinning read mode and an all-pixel read mode, and a main object of the present invention is to provide an image pickup apparatus which can prevent signal electric charges from overflowing in the thinning read mode, can hence eliminate the need of interlaced scanning, and is free from flickers.

According to the present invention, in an image pickup apparatus comprising a solid state image pickup device made up of a plurality of pixels constituted by photoelectric transducers which are two-dimensionally arrayed in the horizontal and vertical directions, a vertical register for receiving signal electric charges of each pixel and transferring the signal electric charges in the vertical direction, and a horizontal register for transferring the signal electric charges in the vertical register in the horizontal direction, and control means for driving and controlling the solid state image pickup device, the control means has a driving function in an all-pixel read mode for transferring the signal electric charges from all the pixels of the solid state image pickup device to the vertical registers to read pixel signals, a driving function in a thinning read mode for transferring the signal electric charges from a number n (n is one or more positive integer) of pixels for each unit of a number m (m is two or more positive integer) of pixels in the vertical direction to the vertical registers to read pixel signals, and a device shutter function for extracting the signal electric charges from each pixel to control a photoelectric conversion time, the control means being designed in the thinning read mode to carry out the operation of extracting the signal electric charges from each pixel one or more times for each read period of one frame.

By carrying out the operation of extracting the signal electric charges from each pixel one or more times for each read period of one frame when the solid state image pickup device is driven in the thinning read mode, it is possible to prevent overflow of signal electric charges from the pixels, from which the signal electric charges are not read, the overflow being otherwise caused during the operation in the thinning read mode. There can be thus provided an image pickup apparatus in which even when the same pixels are read repetitively during the operation in the thinning read mode, overflow of signal electric charges from the pixels which are not read can be prevented; hence interlaced scanning is no longer needed and the occurrence of flickers is avoided.

Another object of the present invention is to provide an image pickup apparatus which can prevent, at the time of shift from the thinning read mode to the all-pixel read mode, the signal electric charges remained in the thinning read mode from mixing in the all-pixel read mode.

According to the present invention, in an image pickup apparatus comprising a solid state image pickup device made up of a plurality of pixels constituted by photoelectric transducers which are two-dimensionally arrayed in the horizontal and vertical directions, a vertical register for receiving signal electric charges of each pixel and transferring the signal electric charges in the vertical direction, and a horizontal register for transferring the signal electric charges in the vertical register in the horizontal direction, and control means for driving and controlling the solid state image pickup device, the control means has a driving function in an all-pixel read mode for transferring the signal electric charges from all the pixels of the solid state image pickup device to the vertical registers to read pixel signals, a driving function in a thinning read mode for transferring the signal electric charges from a number n (n is one or more positive integer) of pixels for each unit of a number m (m is two or more positive integer) of pixels in the vertical direction to the vertical registers to read pixel signals, and a device shutter function for extracting the signal electric charges from each pixel to control a photoelectric conversion time, the control means being designed to carry out the operation of extracting the signal electric charges from each pixel one or more times immediately before the start of exposure when the solid state image pickup device is driven in the all-pixel read mode directly subsequent to the thinning read mode.

By carrying out the operation of extracting the signal electric charges from each pixel one or more times immediately before the start of exposure of the all-pixel read mode when the solid state image pickup device its shifted in operation from the thinning read mode to the all-pixel read mode, there can be provided an image pickup apparatus in which signal electric charges accumulated in the pixels, which are not read, due to multiple exposures during the thinning read mode are surely purged out and prevented from mixing in the all-pixel read mode.

Also, according to the present invention, in an image pickup apparatus comprising a solid state image pickup device made up of a plurality of pixels constituted by photoelectric transducers which are two-dimensionally arrayed in the horizontal and vertical directions, a vertical register for receiving signal electric charges of each pixel and transferring the signal electric charges in the vertical direction, and a horizontal register for transferring the signal electric charges in the vertical register in the horizontal direction, and control means for driving and controlling the solid state image pickup device, the control means has a driving function in an all-pixel read mode for transferring the signal electric charges from all the pixels of the solid state image pickup device to the vertical registers to read pixel signals, a driving function in a thinning read mode for transferring the signal electric charges from a number n (n is one or more positive integer) of pixels for each unit of a number m (m is two or more positive integer) of pixels in the vertical direction to the vertical registers to read pixel signals, and a device shutter function for extracting the signal electric charges from each pixel to control a photoelectric conversion time, the control means being designed to transfer the signal electric charges from all the pixels to the vertical registers at the beginning of the read period of one frame immediately before starting to read the pixel signals of all the pixels when the solid state image pickup device is driven in the all-pixel read mode directly subsequent to the thinning read mode.

By transferring the signal electric charges from all the pixels to the vertical registers at the beginning of the read period of one frame immediately before starting to read the pixel signals of all the pixels when the solid state image pickup device is shifted in operation from the thinning read mode to the all-pixel read mode, there can be provided an image pickup apparatus in which signal electric charges are cleared up from all the pixels, allowing the exposure to start from an empty state, and therefore signal electric charges accumulated due to multiple exposures during the thinning read mode are surely prevented from mixing in the all-pixel read mode.

Still another object of the present invention is to provide an image pickup apparatus which can prevent, at the time of shift from the thinning read mode to the all-pixel read mode, the signal electric charges remained in the thinning read mode from mixing in the all-pixel read mode, and which can also remove smear components leaking into the registers at the same time.

According to the present invention, in an image pickup apparatus comprising a solid state image pickup device made up of a plurality of pixels constituted by photoelectric transducers which are two-dimensionally arrayed in the horizontal and vertical directions, a vertical register for receiving signal electric charges of each pixel and transferring the signal electric charges in the vertical direction, and a horizontal register for transferring the signal electric charges in the vertical register in the horizontal direction, and control means for driving and controlling the solid state image pickup device, the control means has a driving function in an all-pixel read mode for transferring the signal electric charges from all the pixels of the solid state image pickup device to the vertical registers to read pixel signals, a driving function in a thinning read mode for transferring the signal electric charges from a number n (n is one or more positive integer) of pixels for each unit of a number m (m is two or more positive integer) of pixels in the vertical direction to the vertical registers to read pixel signals, and a device shutter function for extracting the signal electric charges from each pixel to control a photoelectric conversion time, the control means being designed to transfer the signal electric charges from all the pixels to the vertical registers and then transfer the signal electric charges in the vertical registers at a high speed immediately before starting to read the pixel signals of all the pixels when the solid state image pickup device is driven in the all-pixel read mode directly subsequent to the thinning read mode.

By transferring the signal electric charges from all the pixels to the vertical registers immediately before starting to read the pixel signals of all the pixels when the solid state image pickup device is shifted in operation from the thinning read mode to the all-pixel read mode, signal electric charges are cleared up from all the pixels, allowing the exposure to start from an empty state, and therefore signal electric charges accumulated due to multiple exposures during the thinning read mode are surely prevented from mixing in the all-pixel read mode. In addition, by transferring the signal electric charges, which have been transferred to the vertical registers, at a high speed for purge-out, smear components leaking into the registers can be removed at the same time.

Still another object of the present invention is to provide an image pickup apparatus which can reduce an amount of electric power consumed in the operation of extracting signal electric charges from each pixel for the device shutter function, while the operation of extracting signal electric charges from each pixel is surely achieved.

According to the present invention, in an image pickup apparatus comprising a solid state image pickup device made up of a plurality of pixels constituted by photoelectric transducers which are two-dimensionally arrayed in the horizontal and vertical directions, a vertical register for receiving signal electric charges of each pixel and transferring the signal electric charges in the vertical direction, and a horizontal register for transferring the signal electric charges in the vertical register in the horizontal direction, and control means for driving and controlling the solid state image pickup device, the control means has a device shutter function for extracting signal electric charges from each pixel to control a photoelectric conversion time, and performs the operation of extracting the signal electric charges from each pixel a number n (n is one or more positive integer) time(s) immediately before the start of exposure.

Hitherto, in a device shutter employed for outputting a motion picture in image pickup apparatus (the term "device shutter" means a function of variably setting a time during which electric charges are generated upon irradiation of light and accumulated in a photodiode constituting each pixel, and providing similar advantages as those obtained by opening and closing a mechanical shutter without needing any movable parts), the operation of extracting signal electric charged from the pixel has been performed by outputting a charge extracting pulse continuously from the beginning of one frame to the time immediately before the start of an exposure period in the same frame. Because the charge extracting pulse is output continuously from the beginning of one frame to the time immediately before the start of the exposure period in the same frame, a large amount of electric power is consumed. In contrast, with the present invention, by performing the operation of extracting the signal electric charges from each pixel a number n time(s) immediately before the start of exposure, the large amount of electric power consumed can be reduced. Also, by performing the operation of extracting the signal electric charges from each pixel a number n time(s) immediately before the start of exposure, the signal electric charges can be surely purged out before the start of exposure. Further, the exposure period is not affected by performing the charge extracting operation in such a manner because the exposure period is given by a period from the time at which the charge extracting operation is ended to the time at which the accumulated signal electric charges are transferred to the vertical register.

Still another object, of the present invention is to provide an image pickup apparatus which can prevent signal electric charges from overflowing into the charge transfer line even if excessively strong light enters the photodiode, and which can produce a satisfactory still picture free from noises.

According to the present invention, in an image pickup apparatus comprising a solid state image pickup device made up of a plurality of pixels constituted by photoelectric transducers which are two-dimensionally arrayed in the horizontal and vertical directions, a vertical register for receiving signal electric charges of each pixel, and transferring the signal electric charges in the vertical direction, and a horizontal register for transferring the signal electric charges in the vertical register in the horizontal direction, and control means for driving and controlling the solid state image pickup device, the control means has a device shutter function for extracting signal electric charges from each pixel to control a photoelectric conversion time, performs the operation of extracting the signal electric charges from each pixel a number n (n is one or more positive integer) time(s) immediately before the start of exposure during a read period in which an output of the solid state image pickup device is used to form a motion picture, and performs the operation of extracting the signal electric charges from each pixel repeatedly to inhibit an exposure operation during a read period in which the output of the solid state image pickup device is used to form a still picture.

If the read period in which the output of the solid state image pickup device is used to form a still picture includes a period in which the operation of extracting the signal electric charged from the pixel is performed and a period in which that operation is not performed, noises occur at the switching point between both the periods and a horizontal streak appears in the still picture. In contrast, with the present invention, by performing the operation of extracting the signal electric charges from the pixel repeatedly to inhibit the exposure operation during the read period in which the output of the solid state image pickup device is used to form a still picture, it is possible to prevent the occurrence of noises and hence the occurrence of a horizontal streak. Also, when the operation of extracting the signal electric charges is switched over, the supply voltage is greatly varied at the switching point and a horizontal streak appears due to a corresponding step difference in brightness because the charge extracting pulse has a high voltage. With the present invention, by continuously performing the operation of extracting the signal electric charges, the supply voltage is not varied during the period in which the device output is used to form a still picture, and therefore a satisfactory still picture output can be produced.

DESCRIPTION OF THE PREFERRED EMBODIMENTS

Figure 1:
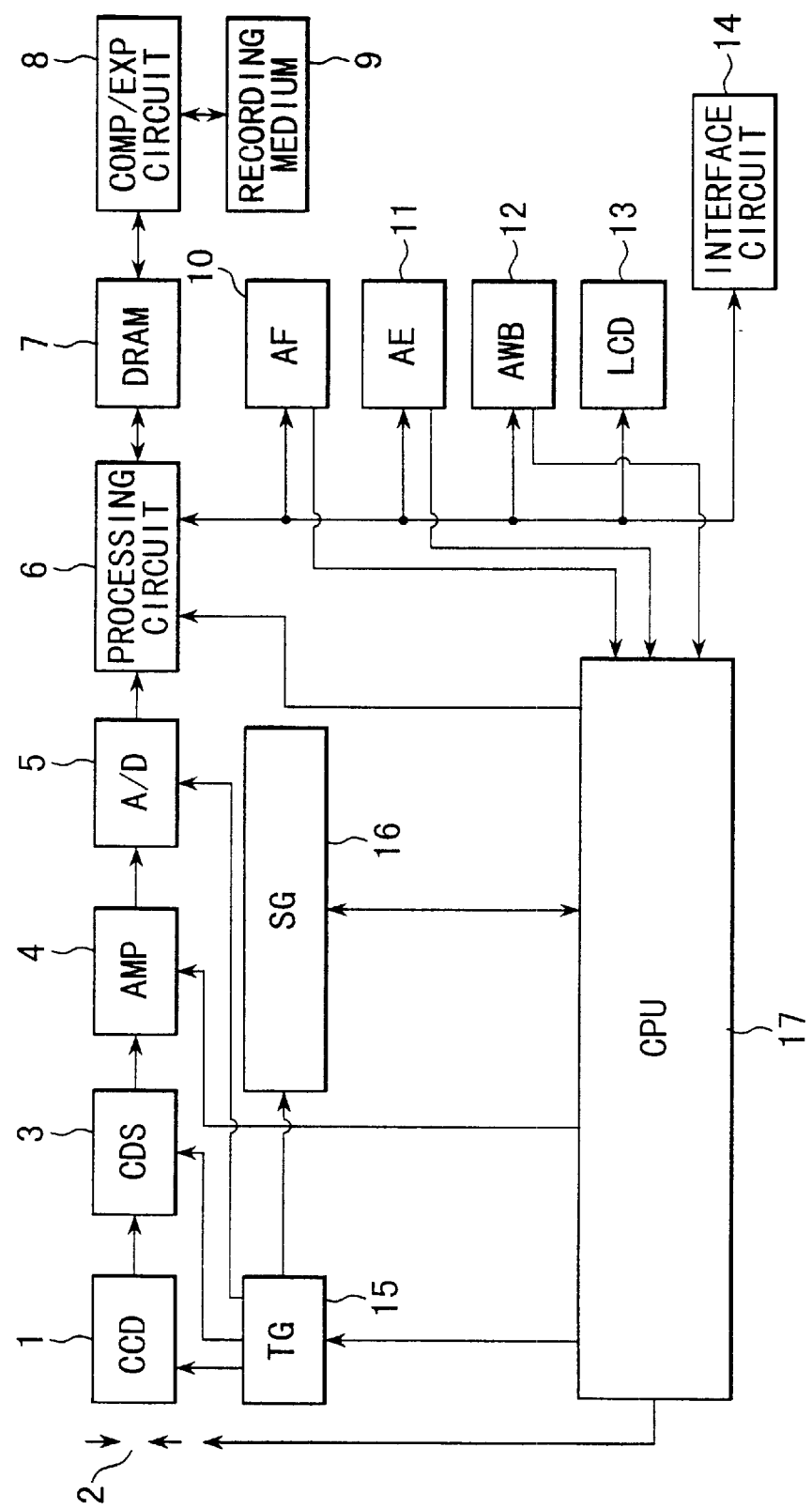
FIG. 1 is a block diagram showing the entire configuration of an image pickup apparatus according to the present invention which is applied to an electronic camera.

Preferred embodiments of the present invention will be described below FIG. 1 is a block diagram showing the general configuration of an image pickup apparatus according to the present invention which is applied to an electronic camera. In FIG. 1, denoted by reference numeral 1 is a CCD image pickup device for performing photoelectric conversion, i.e., converting an optical signal into an electric signal. A light enters the CCD image pickup device 1 through a lens (not shown) and a diaphragm 2. Denoted by 3 is a correlation double sampling (CDS) circuit for removing noises from an-output of the CCD image pickup device 1, and 4 is an amplifier for amplifying an output of the correlation double sampling circuit 3. Denoted by 5 is an A/D converter for converting an output of the amplifier 4 in the form of analog data into digital data, and 6 is a processing circuit for processing, as image data, a signal from the CCD image pickup device 1. Denoted by 7 is a DRAM for temporarily storing the image data subjected to the signal processing in the processing circuit 6, and 8 is a compression/expansion circuit for compressing the image data stored in the DRAM 7 and expanding the compressed data. The compressed data is recorded in a recording medium 9, whereas the recorded data read out of the recording medium 9 is expanded.

Further, denoted by 10 is an AF circuit for making focus control using the image data obtained by processing the signal from the CCD image pickup device 1, 11 is an AE circuit for making exposure control, and 12 is an auto-white balancing (AWB) circuit for setting a white balance. Denoted by 13 is a liquid crystal display unit for displaying, on a liquid crystal screen, the image data obtained by processing the signal from the CCD image pickup device 1. Denoted by 14 is an interface circuit for external display, i.e. for displaying the image data on an external monitor or the like. Denoted by 15 is a timing generator that generates timing pulses for controlling the timed relation of the CCD image pickup device 1, etc., and 16 is an SG circuit for sending a synchronizing signal to the timing generator 15. Denoted by 17 is a CPU for controlling the operation of all the above components.

In the electronic camera thus constructed, the electric signal resulted from the photoelectric conversion in the CCD image pickup device 1 passes the correlation double sampling circuit 3, the amplifier 4 and the A/D converter 5, and is then subjected to the signal processing in the processing circuit 6 for conversion into an image signal. The image signal is first recorded in the recording medium 9 and displayed in the liquid crystal display unit 13 to achieve matching of the angle of field for determining what a still picture is to be recorded. Finally, the image signal is recorded as a still picture in the recording medium 9.

A first embodiment of the drive/control operation of the CCD image pickup device executed by the CPU 17 will be described below. This first embodiment corresponds to a first aspect of the present invention. With the CCD image pickup device constructed of a large number of pixels, as mentioned before, in such an operation as requiring high-speed processing that is needed, e.g., when an image is to be displayed in the liquid crystal display unit and when the AE or AF operation is to be carried out, except the time of recording a still picture, the high-speed processing is performed in a skipping read mode (thinning read mode) because slow-speed processing in an all-pixel read mode takes a longer-period of time.

Figure 2:
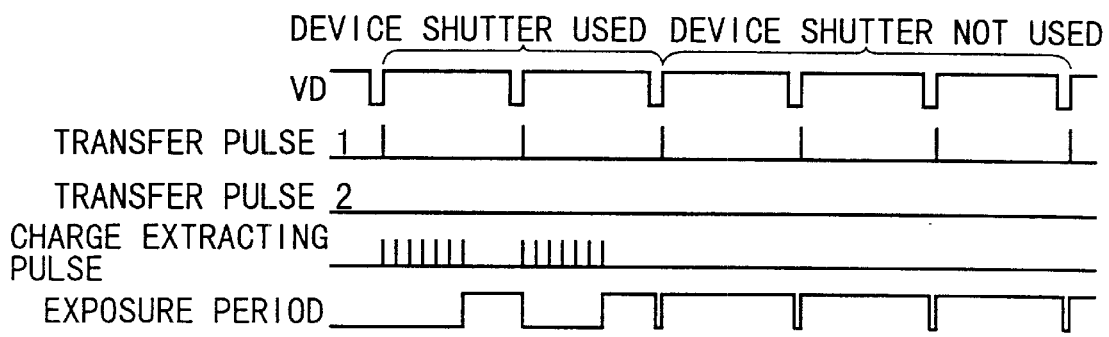
FIG. 2 is a timing chart for explaining the operation in a conventional skipping read mode.
Figure 3:
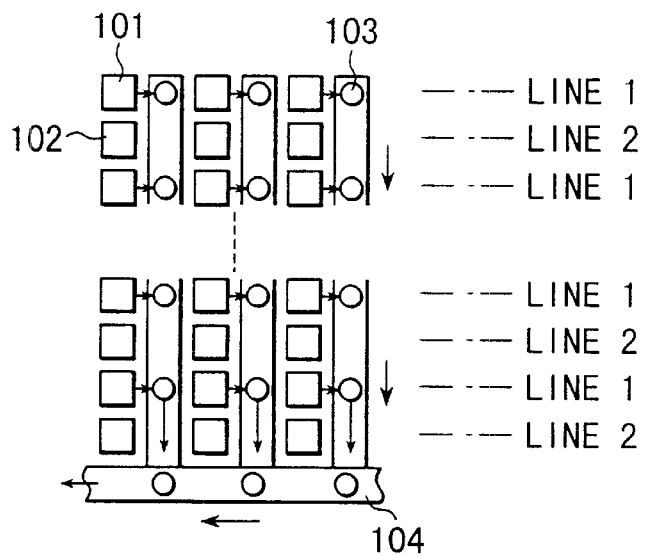
FIG. 3 is an illustration for explaining the read operation of a CCD image pickup, device in the conventional skipping read mode.
Figure 4:
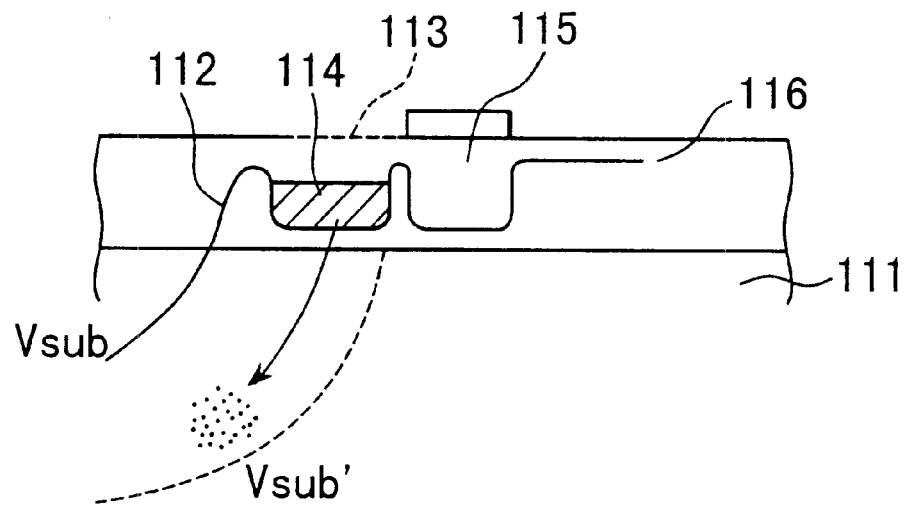
FIG. 4 is an illustration for explaining the device shutter operation in the CCD image pickup device.

The operation in a conventional skipping read mode will now be described with reference to a timing chart of FIG. 2 and an illustration of FIG. 3 for explaining the read operation of the CCD image pickup device. In FIG. 2, VD represents a vertical synchronizing signal, and a transfer pulse 1 is a pulse for transferring signal electric charges of pixels (photodiodes) 101 of each line 1 to corresponding vertical registers 103 in the CCD image pickup device, as shown in FIG. 3. Likewise, a transfer pulse 2 is a pulse for transferring signal electric charges of pixels 102 of each line 2 to corresponding vertical registers 103. A charge extracting pulse is a pulse for, as shown in FIG. 4, changing a potential Vsub of a silicon substrate 111 in the CCD image pickup device to Vsub' to lower a potential barrier 112, and purging out all electric charges 114, which are accumulated in a photodiode 113 constituting a pixel, to the silicon substrate 111 so that no electric charges 114 are accumulated in the photodiode 113. Additionally, in FIG. 4, 115 denotes a vertical register and 116 denotes a CCD surface.

In FIG. 2, an exposure period represented by a high-level is a period during which light enters the CCD image pickup device and electric charges are accumulated therein. When a device shutter is used, exposure is not made over a full period of one frame. Specifically, the charge extracting pulse is output for each predetermined period in one frame, and the exposure period is shorter than the full period of one frame. When a device shutter is not used, the charge extracting pulse is not output and exposure is made over the full period of one frame until signal electric charges are transferred from the pixel to the vertical register in response to the transfer pulse.

In the skipping read mode, as shown in FIG. 2, the transfer pulse 1 is output for each vertical synchronizing pulse VD (in units of one frame), but the transfer pulse 2 is not output at all. Accordingly, as shown in FIG. 3, signal electric charges of only the pixels 101 of the line 1 are transferred to the vertical registers 103, but no electric charges of the pixels 102 of the line 2 are transferred to the vertical registers 103. Note that the case where the transfer pulse 2 is also output for each frame corresponds to the all-pixel read mode. Thus, in the skipping read mode, since signal electric charges of only the pixels 101 of the line 1 are transferred to the vertical registers 103, the electric charges in the vertical registers 103 are moved under double-transfer operation, i.e., carried over two pixels for each operation, followed by transfer into a horizontal register 104. A CCD output is then produced from the horizontal register 104.

Figure 5:
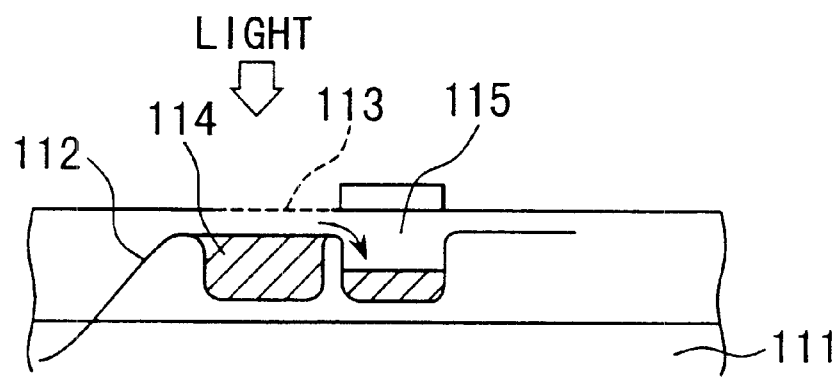
FIG. 5 is an illustration showing a overflown state of electric charges accumulated due to multiple exposures in the conventional skipping reads mode.

If the above-described operation in the skipping read mode is repeated, signal electric charges are accumulated in the photodiodes constituting the pixels of the line 2 and continue accumulating there without being transferred to the vertical registers. Thus in the conventional skipping read mode, as shown in FIG. 5, the signal electric charges tend to accumulate in excess of the capacity of each photodiode and are more likely to overflow into the vertical register.

Figure 6:
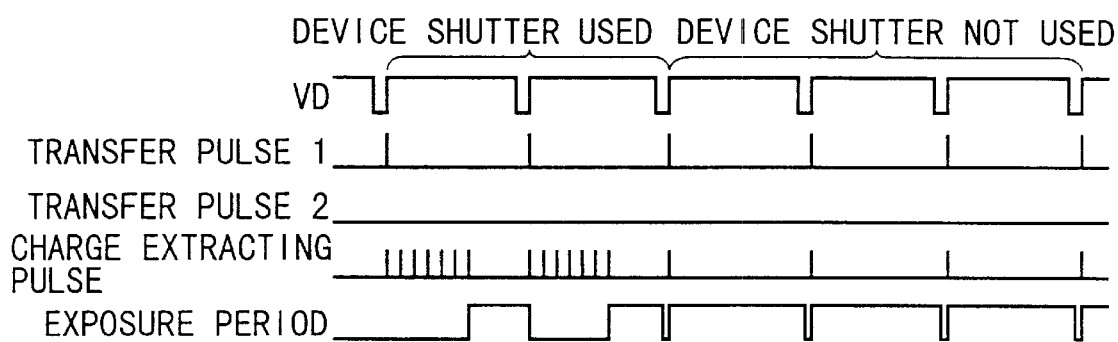
FIG. 6 is a timing chart for explaining a first embodiment of the drive/control operation executed by a CPU in the electronic camera shown in FIG. 1.
Figure 7:
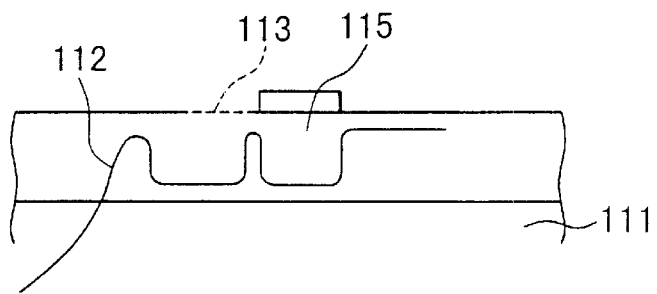
FIG. 7 is an illustration showing a state of electric charges accumulated in the CCD image pickup device during the drive/control operation shown in FIG. 6.

To avoid such a problem, as shown in a timing chart of FIG. 6, this first embodiment is designed to always apply the charge extracting pulse at the beginning of each frame in the skipping read mode. In other words, the charge extracting pulse is applied at the beginning of each frame even when the device shutter is not used. At the start-up of each exposure, therefore, the electric charges in the photodiode are all purged out to the substrate, as shown in FIG. 7, allowing the exposure to start in a condition where no electric charges are accumulated in the photodiode. Consequently, for the pixels of the line 2 to which the transfer pulse 2 is not applied for reading of signal electric charges, the electric charges are purged out to the substrate at least once for each frame, and hence are surely prevented from overflowing into the vertical registers.

A second embodiment of the drive/control operation of the CCD image pickup device executed by the CPU will be described below. This second embodiment corresponds to a second aspect of the present invention. Generally, in electronic cameras, matching of the angle of field is achieved by first effecting the operation of displaying an object image on a liquid crystal screen with a liquid crystal display unit or the like, and then effecting the operation of recording the object image, as a still picture frame, in a recording medium upon a shutter button being pushed. When displaying the object image in the liquid crystal display unit, a skipping read mode is used so as to carry out signal processing at a high speed and to display. On the other hand, when recording a still picture in the recording medium, an all-pixel read mode is used to improve image quality of the recorded frame.

Figure 8:
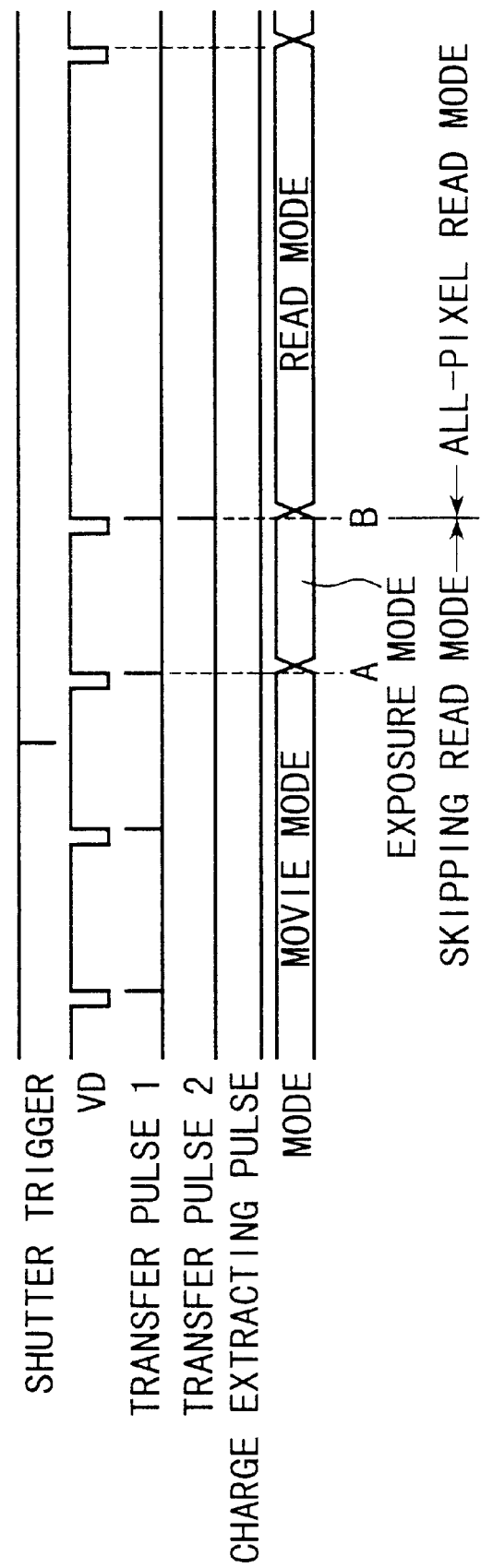
FIG. 8 is a timing chart for explaining the conventional operation at the time of shift from the skipping read mode to an all-pixel read mode.

Thus, in electronic cameras, a still picture is recorded in the recording medium by switching over from the skipping read mode to the all-pixel read mode. FIG. 8 is a timing chart, for explaining the conventional operation at the time of shift from the skipping read mode to the all-pixel read mode. In FIG. 8, a shutter trigger is a pulse output upon a shutter button being pushed. Until the shutter button is pushed, the CCD image pickup device continues operation in the skipping read mode. Then, when the shutter button is pushed and the shutter pulse is output, the operation of the CCD image pickup device shifts to the all-pixel read mode after the VD pulse (vertical synchronizing pulse) output next, thereby starting the operation of recording a still picture.

During the skipping read mode, as described above in connection with the first embodiment, only the transfer pulse 1 is output at the beginning of one frame, but the transfer pulse 2 is not output at all. Also, during the skipping read mode, the device shutter is not used, and therefore the charge extracting pulse is not output at all.

When the shutter trigger is output and the skipping read mode is shifted to the all-pixel read mode, the CCD image pickup device operates in an exposure mode, where light enters the CCD image pickup device and electric charges are accumulated in pixels, in a first period of the VD pulse after the shift to the all-pixel read mode. The electric charges accumulated in the period of the exposure mode are then read in a period of the next read mode. In the above process, when the operation is shifted from the exposure mode to the read mode under the all-pixel read mode, both the transfer pulses 1 and 2 are applied to read all the pixels.

Figure 9:
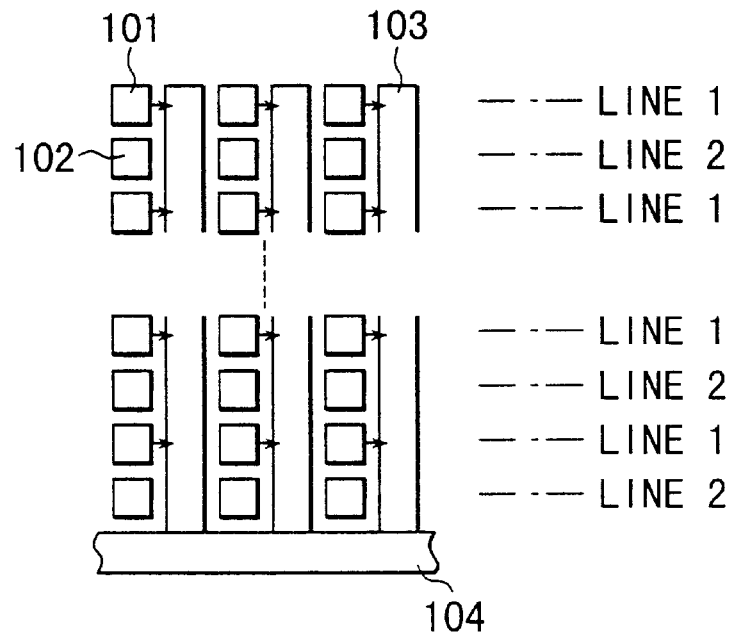
FIG. 9 is an illustration for explaining the operation of the CCD image pickup device at the time A in the timing chart of FIG. 8.
Figure 10:
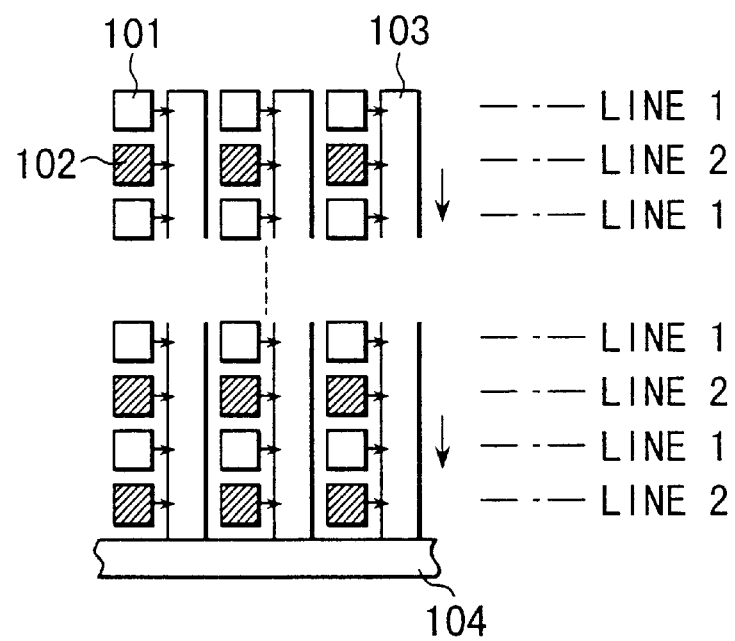
FIG. 10 is an illustration for explaining the operation of the CCD image pickup device at the time B in the timing chart of FIG. 8.

FIG. 9 illustrates the read operation of the CCD image pickup device at the time A in the timing chart of FIG. 8, i.e., at the time of shift from the skipping read mode to the exposure mode under the all-pixel read mode. In the skipping read mode, electric charges are not transferred from the photodiodes constituting the pixels 102 of the line 2 to the vertical registers 103. Hence, electric charges are transferred from only the pixels 101 of the line 1, and electric charges remain left in the photodiodes constituting the pixels 102 of the line 2. At the time B in the timing chart of FIG. 8, i.e., at the time of shift from the exposure mode to the read mode under the all-pixel read mode, both the transfer pulses 1 and 2 are output to read all the pixels, as shown in FIG. 8, whereupon electric charges are transferred from all the pixels to the vertical registers 103, as shown in FIG. 10. On this occasion, however, because the operation of reading or extracting electric charges is not performed on the pixels 102 of the line 2 in the skipping read mode without the device shutter operation, electric charges generated due to multiple exposures are accumulated in the pixels 102, and therefore signal electric charges generated in different exposure times are output when the electric charges are transferred from both the lines 1 and 2.

Figure 11:
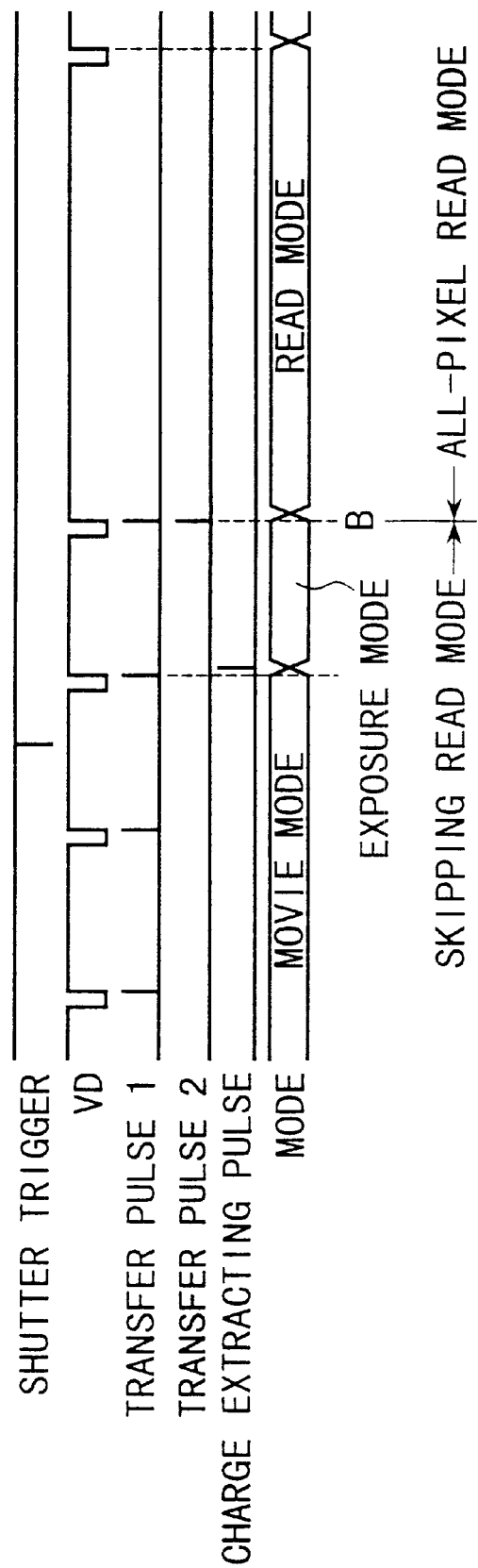
FIG. 11 is a timing chart for explaining a second embodiment of the drive/control operation executed by the CPU in the electronic camera shown in FIG. 1.

To avoid such a problem, as shown in a timing chart of FIG. 11, this second embodiment is designed such that when the shutter trigger is output and the skipping read mode is shifted to the all-pixel read mode, the charge extracting pulse, which has not been output during the skipping read mode, is output at least once immediately after the shift from the skipping read mode to the all-pixel read mode. By applying the charge extracting pulse, electric charges accumulated in the photodiodes of all the pixels are once purged out thoroughly so that, in the exposure mode under the all-pixel read mode, exposure starts to accumulate electric charges from a condition where no electric charges are accumulated in any pixels. Accordingly, when the read operation from all the pixels is performed by outputting both the transfer pulses 1 and 2 in the read period under the all-pixel read mode, the problem described above in connection with FIG. 10, i.e., the problem that signal electric charges are output at different exposure levels, is avoided. Further, a still picture can be likewise recorded regardless of change in shutter speed.

A third embodiment of the drive/control operation of the CCD image pickup device executed by the CPU will be described below with reference to FIG. 12. This third embodiment corresponds to a third aspect of the present invention.

As with the second embodiment shown in FIG. 11, the third embodiment intends to avoid exposure levels for the respective lines from differing from each other at the time of shift from the exposure mode to the read mode under the all-pixel read mode. Comparing the second embodiment shown in FIG. 11 wherein the charge extracting pulse is output immediately after the shift from the skipping read mode to the all-pixel read mode, the third embodiment is different in that when the shutter trigger is output and the skipping read mode is shifted to the all-pixel read mode, the, transfer pulse 2 is also output along with the transfer pulse 1 immediately before the exposure mode under the all-pixel read mode starts. By applying both the transfer pulses 1 and 2, electric charges in the photodiodes of all the pixels are transferred to the vertical registers in a like manner to the all-pixel read mode prior to the period of the exposure mode, followed by being transferred to the horizontal register. The electric charges accumulated in all of the photodiodes and the vertical registers are cleared up. After that, both the transfer pulses 1 and 2 are output again at the beginning of the read mode, whereupon signal electric charges accumulated during the period of the exposure mode are transferred from all the photodiodes to the vertical registers for achieving the read operation from all the pixels.

Figure 12:
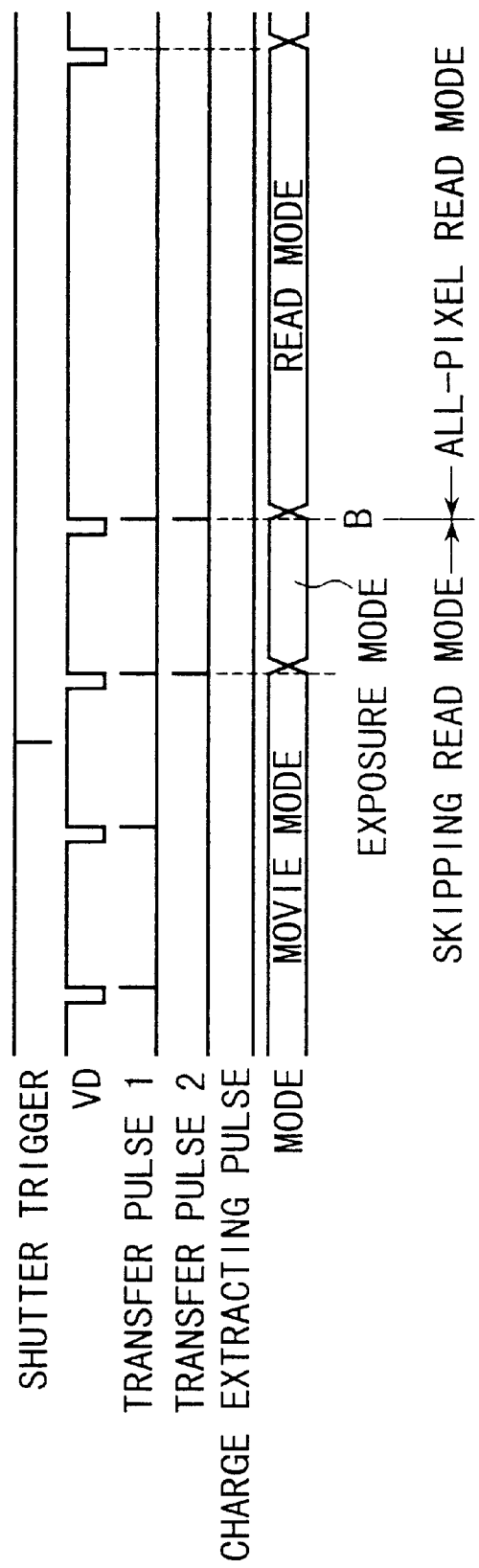
FIG. 12 is a timing chart for explaining a third embodiment of the drive/control operation executed by the CPU in the electronic camera shown in FIG. 1.
Figure 13:
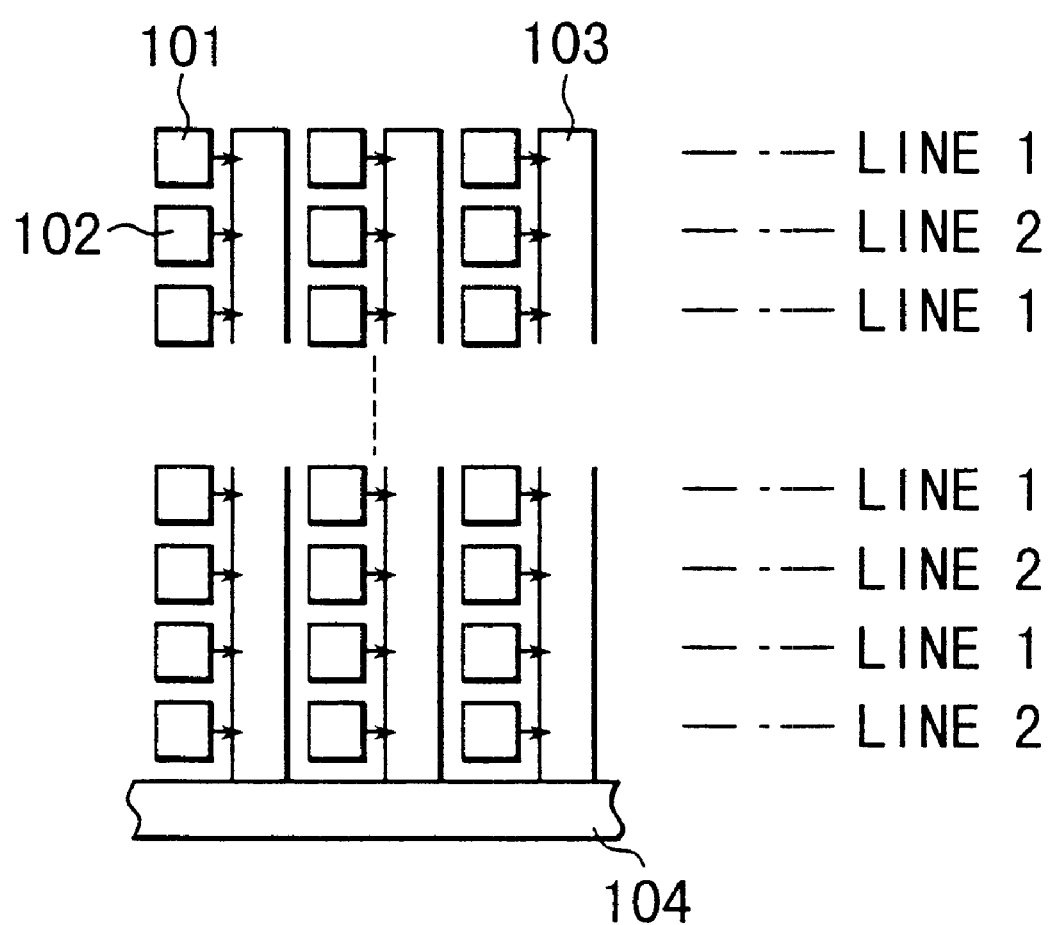
FIG. 13 is an illustration for explaining the operation of the CCD image pickup device at the time B in the timing charts of FIGS. 11 and 12.

FIG. 13 illustrates the read operation of the CCD image pickup device at the time B in the timing charts of the second and third embodiments shown respectively in FIGS. 11 and 12, i.e., at the beginning of the read mode. In the read operation of the CCD image pickup device at the time B, i.e., at the beginning of the read mode, according to the conventional process shown in FIG. 8, the lines 1 and 2 have different exposure times from each other, as shown in FIG. 10, because the line 2 is subjected to multiple exposures. By contrast, in the second and third embodiments of the present invention, since no electric charges are accumulated in any photodiodes at the beginning of the exposure mode, electric charges accumulated in the same exposure time regardless of the lines can be read at the beginning of the read mode, as shown in FIG. 13. Thus, in the second and third embodiments shown in FIGS. 11 and 12, it is possible to read electric charges accumulated in the same exposure time regardless of the lines at the time of shift from the skipping read mode to the all-pixel read mode.

Figure 14:
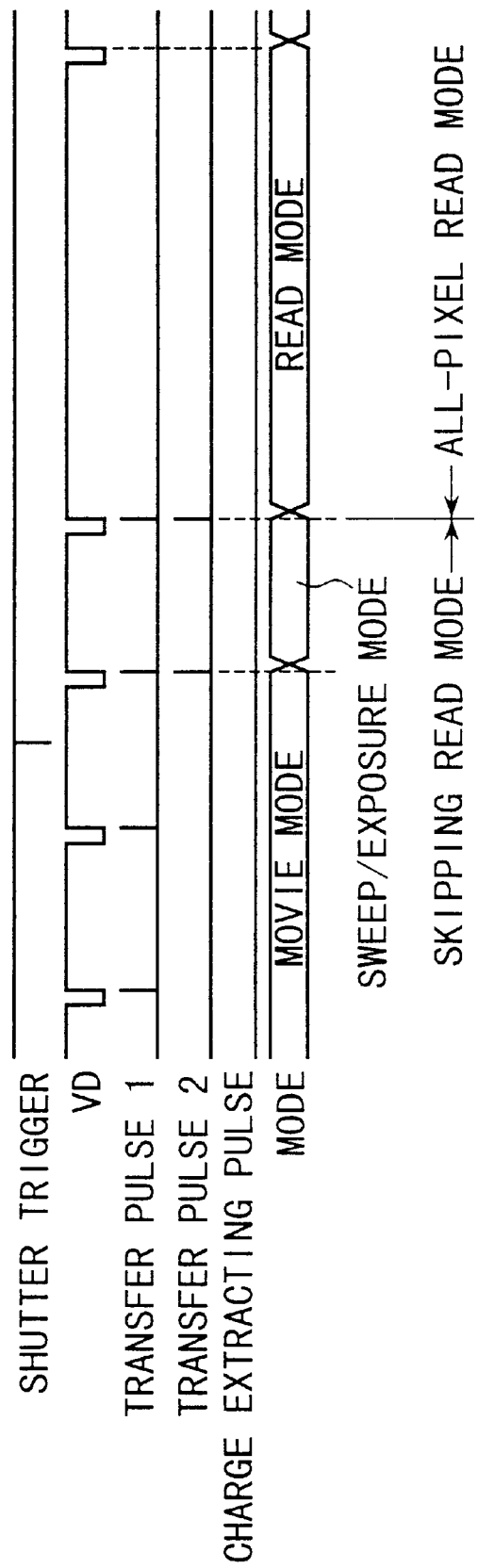
FIG. 14 is a timing chart for explaining a fourth embodiment of the drive/control operation executed by the CPU in the electronic camera shown in FIG. 1.

A fourth embodiment of the drive/control operation of the CCD image pickup device executed by the CPU will be described below with reference to FIG. 14. This fourth embodiment corresponds to a fourth aspect of the present invention. When both the transfer pulses 1 and 2 are output to read signal electric charges of all the pixels at the time of shift from the skipping read mode to the all-pixel read mode like the third embodiment shown in FIG. 12, signal electric charges are transferred from all the photodiodes to the vertical registers; hence all the photodiodes are deprived of electric charges accumulated so far therein. However, the electric charges transferred from the photodiodes to the vertical registers still remain in the vertical registers immediately after the transfer to there. The electric charges transferred and remaining in the vertical registers are useless, and the electric charges transferred from the photodiodes constituting the pixels of the line 2 are particularly useless because they are generated due to multiple exposures. The electric charges transferred to the vertical registers are therefore all once output to the outside within the period of the exposure mode.

With the above in mind, in this fourth embodiment, after signal electric charges have been transferred from the photodiodes of all the pixels to the vertical registers as with the third embodiment shown in FIG. 12, all the useless electric charges in the vertical registers are transferred at a high speed for purge-out within the period of the exposure mode. By so transferring the useless electric charges at a high speed to be swept away from the vertical registers repeatedly, smear components leaking into the registers can also be removed at the same time.

Figure 15:
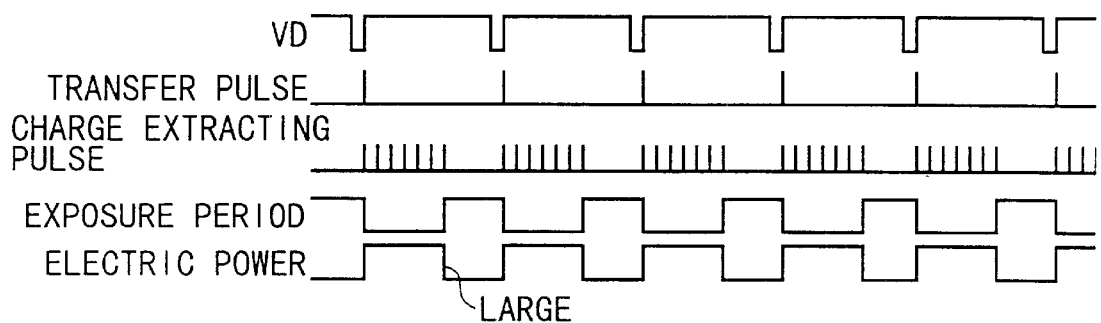
FIG. 15 is a timing chart for explaining the operation to output a motion picture by using a device shutter in a conventional image pickup apparatus.

A fifth embodiment will be described below. This fifth embodiment corresponds to a fifth aspect of the present invention. In general, when a motion picture is output in an electronic camera by using device shutters, one frame is formed per VD (vertical synchronizing signal) shown in FIG. 15. More specifically, a transfer pulse is output per VD to transfer signal electric charges, which are accumulated in photodiodes, to vertical registers. In the next period of one frame, resulting image data is then displayed. When the device shutter is used, a charge extracting pulse is always output from the beginning of each frame until the time to start exposure, as shown in FIG. 15, for thereby setting an exposure period required for operating the device shutter. Upon reaching the time to start exposure that is determined for setting the required exposure period, the charge extracting pulse is stopped from being output. A period from the time to start exposure to the time to output the next transfer pulse is given as the exposure period during which electric charges are accumulated in the photodiode.

However, the charge extracting pulse used for operating the device shutter has a high voltage and is output in a large number. A large amount of electric power is consumed correspondingly, as shown in FIG. 15, and hence the battery life is shortened.

Figure 16:
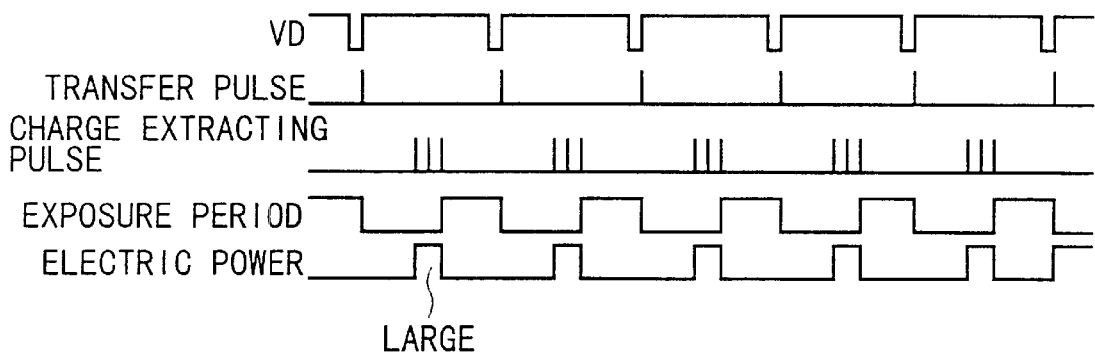
FIG. 16 is a timing chart for explaining a fifth embodiment of the drive/control operation executed by the CPU in the electronic camera shown in FIG. 1.

With the above in mind, in this fifth embodiment, the charge extracting pulse is not output so many and held at a necessary minimum number, as shown in FIG. 16. In the case of operating the device shutter, the exposure period from the time to stop the output of the charge extracting pulse to the time to output the next transfer pulse is important. In a period before the exposure period, therefore, it is not necessary to output the charge extracting pulse all over such a preceding period. In other words, it is just required to output at least one charge extracting pulse for purging out the electric charges immediately before reaching the time to start exposure that is determined for setting the required exposure period. By so outputting the charge extracting pulse, a period from the time at which the electric charges are purged out to the time at which the next transfer pulse is output is given as the exposure period during which electric charges generated during the predetermined shutter operation are accumulated in the photodiode.

Thus, in this fifth embodiment, the charge extracting pulse is not output all over the period from the beginning of each frame to the time to start exposure, but output at least once immediately before the time to start exposure. Although the charge extracting pulse is output three times in FIG. 16, it is preferably required to output the charge extracting pulse two or more times. By so outputting the charge extracting pulse, even if electric charges are not completely purged out upon the first pulse being output, the remaining electric charges are surely purged out upon the subsequent pulses being output. As a result, precise electric charges can be accumulated in the exposure period based on the device shutter operation while reducing an amount of consumed electric power.

Figure 17:
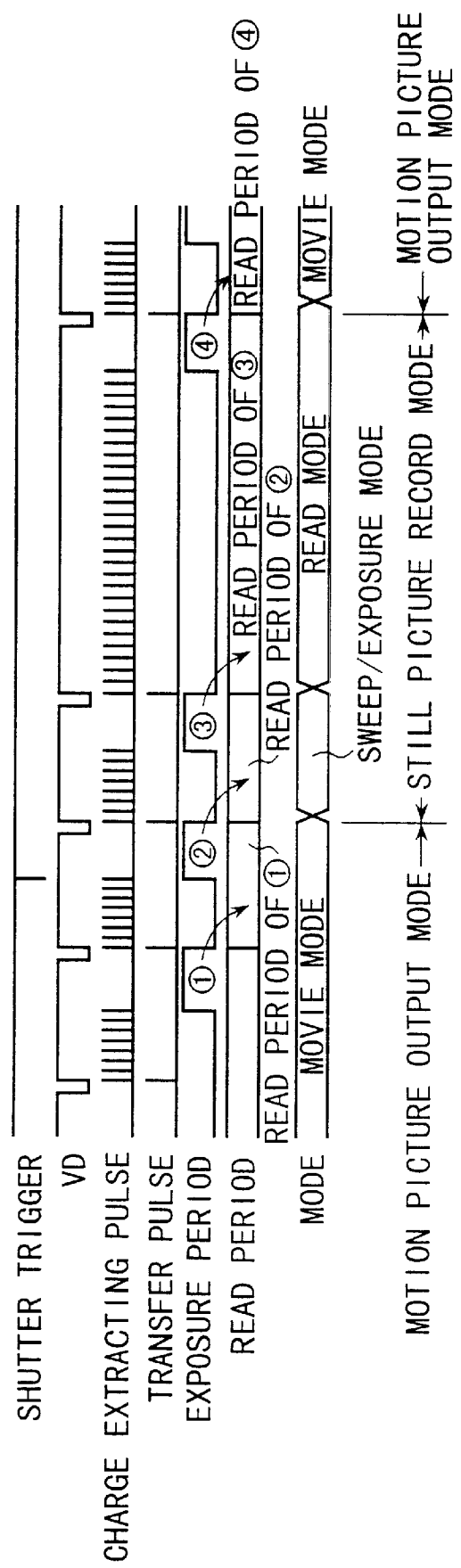
FIG. 17 is a timing chart for explaining the operation of the conventional image pickup apparatus in a motion picture output mode and a still picture record mode.

A sixth embodiment will be described below. This sixth embodiment corresponds to a sixth aspect of the present invention. Generally, an electronic camera is operated such that a motion picture is output to a liquid crystal display unit and a monitor connected via a cable until a shutter button is pushed, and a still picture is recorded in a recording medium upon the shutter button being pushed. FIG. 17 is a timing chart for explaining the operation of the conventional image pickup device in a motion picture output mode for outputting a motion picture and a still picture record mode for recording a still picture. As shown in FIG. 17, when the shutter button is pushed and the shutter trigger is output, the operation shifts from the motion picture output mode to the still picture record mode. A period of the still picture record mode consists of a period of an exposure mode in which light enters the CCD image pickup device, and a period of a read mode in which electric charges accumulated in the exposure period are read and recorded as a still picture. During the period of the read mode under the still picture record mode, the electric charges generated due to exposure in the preceding period of the exposure mode are read. When the period of the read mode is completed, a still picture is recorded, followed by shift to the next motion picture output mode. In the conventional apparatus, therefore, an exposure period is also provided in the period of the read mode as shown at ④ in FIG. 17, and electric charges generated due to exposure in the period ④ are read in the motion picture output mode to form the next frame.

Figure 19A:
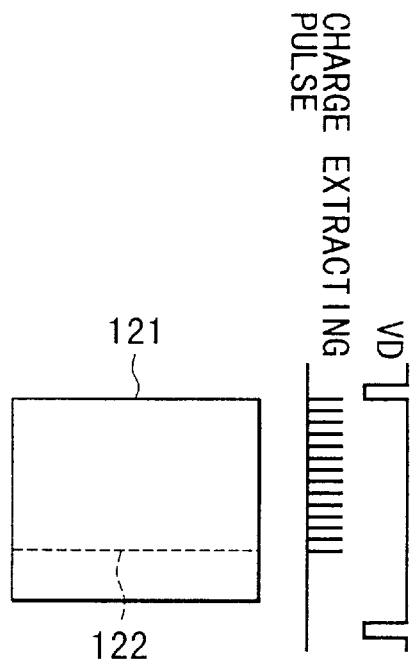
FIGS. 19A and 19B are illustrations showing examples of still pictures formed by the operation in accordance with the timing charts shown in FIGS. 17 and 18, respectively.

However, the above conventional method of providing the exposure period in the period of the read mode, there arises a problem below. Because the charge extracting pulse is not output in the exposure period, the period of the read mode necessarily includes a period in which the charge extracting pulse is output and a period in which it is not output. The voltage of the charge extracting pulse is so high that the supply voltage is greatly varied at the boundary between the period in which the charge extracting pulse is output and the period in which it is not output, thereby giving rise to noises or the like. This results in that a horizontal streak 122 occurs in an output displayed as a still picture frame 121 at the timing corresponding to the above boundary, as shown in FIG. 19A.

Figure 18:
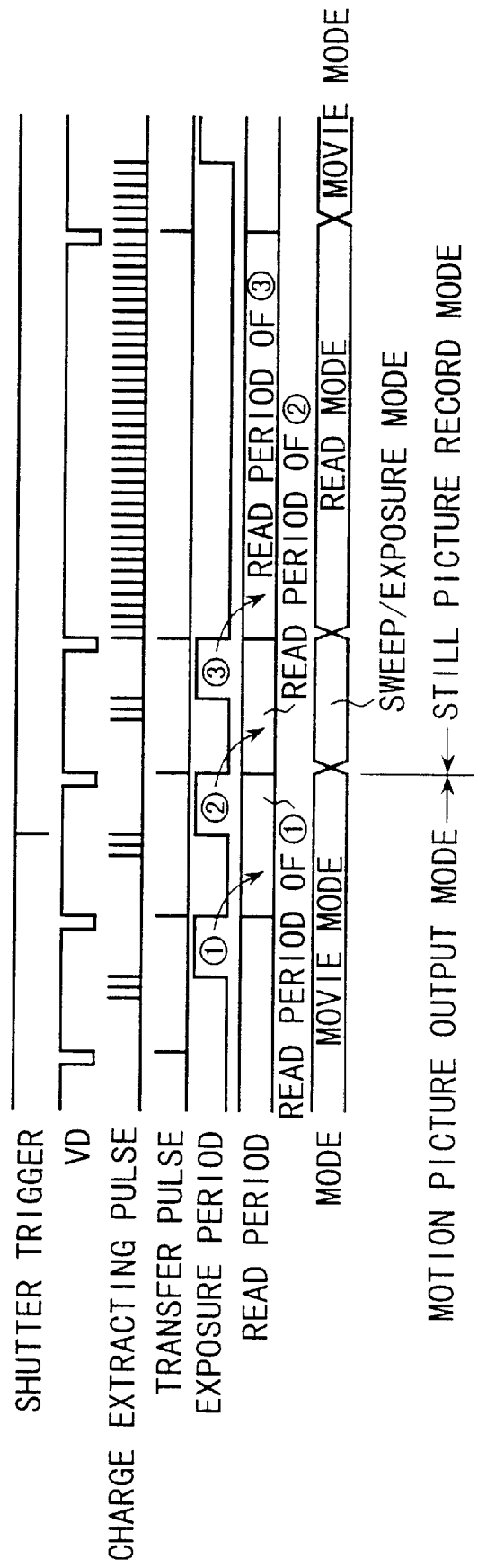
FIG. 18 is a timing chart for explaining a sixth embodiment of the drive/control operation executed by the CPU in the electronic camera shown in FIG. 1.
Figure 19B:
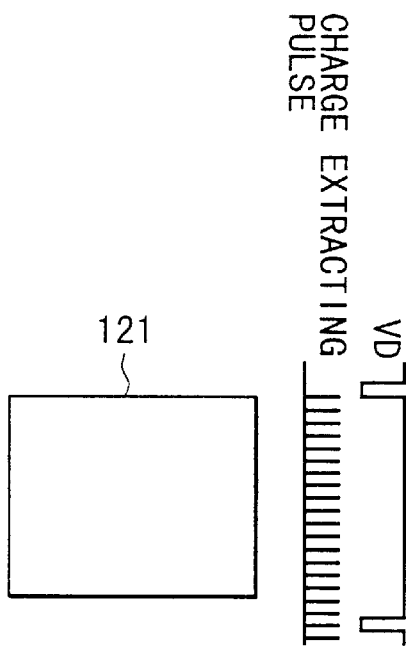

To prevent such a horizontal streak from appearing in the still picture frame, in this sixth embodiment, the charge extracting pulse is continuously output all over the period of the read mode under the still picture record mode so that the exposure period is eliminated to inhibit electric charges from being accumulated in the photodiode during the read mode, as shown in FIG. 18. With this modification, the period of the read mode is avoided from including both the period in which the charge extracting pulse is output and the period in which it is not output, and the charge extracting pulse is continuously output all over the read period, resulting in that voltage variations do not occur and a horizontal streak does not appear in the still picture frame, as shown in FIG. 19B. Further, because of the charge extracting pulse being always output during the read period, even if excessively strong light partly enters the photodiode, useless electric charges are prevented from overflowing from the photodiode into the charge transfer line. It is to be noted that, in this sixth embodiment, since the charge extracting pulse is continuously output all over the period of the read mode under the still picture record mode and the exposure period in which electric charges generated due to exposure are accumulated to be read in the motion picture output mode subsequent to the still picture record mode is not provided, a first frame is not output in the motion picture output mode subsequent to the still picture record mode. However, immediately after the end of the read period in the still picture record mode, processing for the record operation on the recording medium, etc. are performed and the next image pickup operation is not started at once. Thus, there arise no problem despite that the motion picture output of one frame is not produced.

As described above in connection with the preferred embodiments, the present invention can provide the advantages below. According to the first aspect of the present invention, since the operation of extracting the signal electric charges from each pixel is carried out one or more times for each read period of one frame when the image pickup device is driven in the thinning read mode, it is possible to prevent overflow of signal electric charges from the pixels, that is otherwise caused during the operation in the thinning read mode; hence interlaced scanning is no longer needed and the occurrence of flickers is avoided. According to the second aspect of the present invention, since the operation of extracting the signal electric charges from each pixel is carried out one or more times immediately before the start of exposure in the all-pixel read mode when the image pickup device is shifted in operation from the thinning read mode to the all-pixel read mode, signal electric charges accumulated in the pixels due to multiple exposures during the thinning read mode are surely purged out and prevented from mixing in the all-pixel read mode. According to the third aspect of the present invention, since the signal electric charges are transferred from all the pixels to the vertical registers at the beginning of the read period of one frame immediately before starting to read the pixel signals of all the pixels when the image pickup device is shifted in operation from the thinning read mode to the all-pixel read mode, the exposure can be started in an empty condition where electric charges are cleared up from all the pixels, and therefore signal electric charges accumulated due to multiple exposures during the thinning read mode are surely prevented from mixing in the all-pixel read mode.

Also, according to the fourth aspect of the present invention, since the signal electric charges are transferred from all the pixels to the vertical registers and the signal electric charges in the vertical registers are then transferred at a high speed for purge-out immediately before starting to read the pixel signals of all the pixels when the solid state image pickup device is shifted in operation from the thinning read mode to the all-pixel read mode, the exposure can be started in an empty condition where electric charges are cleared up from all the pixels, and therefore signal electric charges accumulated due to multiple exposures during the thinning read mode are surely prevented from mixing in the all-pixel read mode. In addition, smear components leaking into the vertical registers can be removed at the same time. According to the fifth aspect of the present invention, since the operation of extracting the signal electric charges from each pixel for the device shutter function is performed a number n time(s) immediately before the start of exposure, the signal electric charges can be surely purged out before the start of exposure while reducing the large amount of electric power consumed. According to the sixth aspect of the present invention, since the operation of extracting the signal electric charges from the pixel is performed repeatedly to inhibit the exposure operation during the read period in which the output of the image pickup device is used to form a still picture, it is possible to prevent the occurrence of noises and hence the occurrence of a horizontal streak at the point in time at which the operation of extracting the signal electric charges is switched over.

What is claimed is:

1. An image pickup apparatus comprising a solid state image pickup device made up of a plurality of pixels constituted by photoelectric transducers which are two-dimensionally arrayed in the horizontal and vertical directions, a vertical register for receiving signal electric charges of each pixel and transferring the signal electric charges in the vertical direction, and a horizontal register for transferring the signal electric charges in said vertical register in the horizontal direction, and control means for driving and controlling said solid state image pickup device, wherein said control means has a driving function in an all-pixel read mode for transferring the signal electric charges from all the pixels of said solid state image pickup device to said vertical registers to read pixel signals, a driving function in a thinning read mode for transferring the signal electric charges from a number n (n is one or more positive integer) of pixels for each unit of a number m (m is two or more positive integer) of pixels in the vertical direction to said vertical registers to read pixel signals, and a device shutter function for extracting the signal electric charges from each pixel to control a photoelectric conversion time, said control means being designed in the thinning read mode to carry out the operation of extracting the signal electric charges from each pixel one or more times for each read period of one frame.

2. An image pickup apparatus comprising a solid state image pickup device made up of a plurality of pixels constituted by photoelectric transducers which are two-dimensionally arrayed in the horizontal and vertical directions, a vertical register for receiving signal electric charges of each pixel and transferring the signal electric charges in the vertical direction, and a horizontal register for transferring the signal electric charges in said vertical register in the horizontal direction, and control means for driving and controlling said solid state image pickup device, wherein said control means has a driving function in an all-pixel read mode for transferring the signal electric charges from all the pixels of said solid state image pickup device to said vertical registers to read pixel signals, a driving function in a thinning read mode for transferring the signal electric charges from a number n (n is one or more positive integer) of pixels for each unit of a number m (m is two or more positive integer) of pixels in the vertical direction to said vertical registers to read pixel signals, and a device shutter function for extracting the signal electric charges from each pixel to control a photoelectric conversion time, said control means being designed to carry out the operation of extracting the signal electric charges from each pixel one or more times immediately before the start of exposure when said solid state image pickup device is driven in the all-pixel read mode directly subsequent to the thinning read mode.

3. An image pickup apparatus comprising a solid state image pickup device made up of a plurality of pixels constituted by photoelectric transducers which are two-dimensionally arrayed in the horizontal and vertical directions, a vertical register for receiving signal electric charges of each pixel and transferring the signal electric charges in the vertical direction, and a horizontal register for transferring the signal electric charges in said vertical register in the horizontal direction, and control means for driving and controlling said solid state image pickup device, wherein said control means has a driving function in an all-pixel read mode for transferring the signal electric charges from all the pixels of said solid state image pickup device to said vertical registers to read pixel signals, a driving function in a thinning read mode for transferring the signal electric charges from a number n (n is one or more positive integer) of pixels for each unit of a number m (m is two or more positive integer) of pixels in the vertical direction to said vertical registers to read pixel signals, and a device shutter function for extracting the signal electric charges from each pixel to control a photoelectric conversion time, said control means being designed to transfer the signal. electric charges from all the pixels to said vertical registers at the beginning of the read period of one frame immediately before starting to read the pixel signals of all the pixels when said solid state image pickup device is driven in the all-pixel read mode directly subsequent to the thinning read mode.

4. An image pickup apparatus comprising a solid state image pickup device made up of a plurality of pixels constituted by photoelectric transducers which are two-dimensionally arrayed in the horizontal and vertical directions, a vertical register for receiving signal electric charges of each pixel and transferring the signal electric charges in the vertical direction, and a horizontal register for transferring the signal electric charges in said vertical register in the horizontal direction, and control means for driving and controlling said solid state image pickup device, wherein said control means has a driving function in an all-pixel read mode for transferring the signal electric charges from all the pixels of said solid state image pickup device to said vertical registers to read pixel signals, a driving function in a thinning read mode for transferring the signal electric charges from a number n (n is one or more positive integer) of pixels for each unit of a number m (m is two or more positive integer) of pixels in the vertical direction to said vertical registers to read pixel signals, and a device shutter function for extracting the signal electric charges from each pixel to control a photoelectric conversion time, said control means being designed to transfer the signal electric charges from all the pixels to said vertical registers and then transfer the signal electric charges in said vertical registers at a high speed immediately before starting to read the pixel signals of all the pixels when said solid state image pickup device is driven in the all-pixel read mode directly subsequent to the thinning read mode.

5. An image pickup apparatus comprising a solid state image pickup device made up of a plurality of pixels constituted by photoelectric transducers which are two-dimensionally arrayed in the horizontal and vertical directions, a vertical register for receiving signal electric charges of each pixel and transferring the signal electric charges in the vertical direction, and a horizontal register for transferring the signal electric charges in said vertical register in the horizontal direction, and control means for driving and controlling said solid state image pickup device, wherein said control means has a device shutter function for extracting signal electric charges from each pixel to control a photoelectric conversion time, performs the operation of extracting the signal electric charges from each pixel a number n (n is one or more positive integer) time(s) immediately before the start of exposure during a read period in which an output of the solid state image pickup device is used to form a motion picture, and performs the operation of extracting the signal electric charges from each pixel repeatedly to inhibit an exposure operation during a read period in which an output of said solid state image pickup device is used to form a still picture.

* * * * *